US008256082B2

(12) United States Patent
Bilstein et al.

(10) Patent No.: US 8,256,082 B2
(45) Date of Patent: Sep. 4, 2012

(54) MULTI-PART PIN REMOVER FOR REMOVING A PIN OR STUD FROM A HOLE OF A COMPONENT

(75) Inventors: Björn Bilstein, Essen (DE); Peter Schröder, Essen (DE)

(73) Assignee: Siemens Aktiengesellschaft, München (DE)

( * ) Notice: Subject to any disclaimer, the term of this patent is extended or adjusted under 35 U.S.C. 154(b) by 444 days.

(21) Appl. No.: 12/594,622

(22) PCT Filed: Mar. 19, 2008

(86) PCT No.: PCT/EP2008/053263

§ 371 (c)(1),
(2), (4) Date: Oct. 5, 2009

(87) PCT Pub. No.: WO2008/122491

PCT Pub. Date: Oct. 16, 2008

(65) Prior Publication Data

US 2010/0115747 A1 May 13, 2010

(30) Foreign Application Priority Data

Apr. 5, 2007 (EP) .................................. 070007216

(51) Int. Cl.
*B23P 19/04* (2006.01)

(52) U.S. Cl. ................. 29/256; 29/270; 29/258; 29/249

(58) Field of Classification Search .................. 269/256, 269/246, 43, 71, 152, 249, 258, 3, 6, 95; 29/256, 246, 271, 252, 249, 258, 270
See application file for complete search history.

(56) References Cited

U.S. PATENT DOCUMENTS

| | | | | |
|---|---|---|---|---|
| 4,438,913 | A * | 3/1984 | Hylla | 269/60 |
| 6,062,541 | A * | 5/2000 | Hampton | 254/98 |
| 6,179,279 | B1 * | 1/2001 | Asai et al. | 269/164 |
| 6,560,836 | B1 * | 5/2003 | Briscoe | 29/259 |
| 7,174,614 | B2 * | 2/2007 | Martz et al. | 29/257 |
| 7,421,768 | B2 * | 9/2008 | Chiang | 29/237 |
| 7,997,568 | B2 * | 8/2011 | Krizan et al. | 269/93 |
| 2007/0069440 | A1 * | 3/2007 | Lin | 269/246 |
| 2010/0115747 | A1 * | 5/2010 | Bilstein et al. | 29/256 |

FOREIGN PATENT DOCUMENTS

| | | | |
|---|---|---|---|
| DE | 1853600 | U | 6/1962 |
| DE | 4038603 | A1 | 6/1992 |
| DE | 202006014177 | U1 | 11/2006 |
| FR | 2776951 | A1 | 10/1999 |

* cited by examiner

*Primary Examiner* — Lee D Wilson

(57) ABSTRACT

A multi-part pin remover for removing a pin from a hole of a component is provided. A holder of the pin remover that is supported on the component is equipped with a projection that aligns the pin remover with respect to the component in order to reliably prevent any twisting of the pin when removing the pin from the hole.

7 Claims, 2 Drawing Sheets

MULTI-PART PIN REMOVER FOR REMOVING A PIN OR STUD FROM A HOLE OF A COMPONENT

CROSS REFERENCE TO RELATED APPLICATIONS

This application is the US National Stage of International Application No. PCT/EP2008/053263, filed Mar. 19, 2008 and claims the benefit thereof. The International Application claims the benefits of European Patent Office application No. 07007216.0 EP filed Apr. 5, 2007, both of the applications are incorporated by reference herein in their entirety.

FIELD OF INVENTION

The invention relates to a multi-part pin remover for removing a pin or stud from a hole of a component, said multi-part pin remover comprising a pull rod that is provided with a thread and a holder that accommodates the pull rod and can be supported on the component for releasing the pin from the component, wherein the pull rod is connectable in a positive locking manner to the pin to be released and, in the state connected to the pin, is displaceable in the pulling direction by rotating a screw nut that is supported on the holder.

BACKGROUND OF INVENTION

Multi-part pin removers for removing a pin or stud from a hole of a component are known in general, such as, for example, in DE 18 53 600 U and DE 20 2006 014 177 U1. The pins usually sit securely in the component and are generally retained by means of friction. The pin, in this case, is frequently recessed so as to be flush and multi-part pin removers are used to release the recessed pin. As a rule, in this case, the pin remover comprises a pull rod that is screw-connectable to the pin to be removed, said pull rod being supportable on the holder and displaceable in its axial direction under the effect of a force to remove the pin. In this case when the pin is being pulled out, the holder of the pin remover is supported on the component, which consequently forms the thrust bearing for the force acting on the pull rod.

It has proved disadvantageous that when the pin is being pulled out, the holder or the pull rod can tilt relative to the axial direction of the pin, which can result in damage to the component when the pin is being released. The damage can be widening in the region of the opening of the hole. When a replacement pin is inserted, this damage can result in a less secure friction fit between pin and component, which can cause the pin to be released in an unwanted manner from the component.

If the pin to be extracted is screw-connectable to the pull rod, the thread chamfers of one of the two components can also abrade due to a non-axially parallel arrangement of pin and pull rod so that, where applicable, a pin to be released is no longer removable from the component.

SUMMARY OF INVENTION

It is the object of the invention, consequently, to provide a multi-part pin remover, by means of which damage to the component, from which the pin or stud is to be removed, is reliably avoided.

Accordingly, another object of the invention is to reduce the abrasive wear on the components of the pin and pull rod participating in the positive locking connection.

This object is achieved according to the invention through a multi-part pin remover according to the features of the claims.

The realization underlying the invention is that if the holder has means to align the pin remover relative to the component, both abrasive wear on the components of the pin and pull rod participating in the positive fit and tilting of the pull rod relative to the axial direction of the pin can be reliably avoided. Due to the means provided, the pull rod is always displaced in the pulling direction concentrically to the axial axis of the pin or stud so that abrasive wear at the component caused by tilting can be avoided. Abrasive wear at the components of the pin and the pin remover that form the positive fit can also be reliably avoided, as, on account of the predetermined fixed alignment and positioning of the pin remover relative to the pin, the positive fit can always be brought about as prescribed.

The holder has a hook-shaped projection as means for aligning the pin remover. The hook-shaped projection, in this case, is matched to the groove depth so that displacement of the pin remover in this direction during the releasing of the pin can be reliably avoided.

Advantageous developments are provided in the sub claims.

In an expedient manner, the hook-shaped projection is insertable preferably almost free from play, that is with accuracy of fit, into a groove that is provided on the component. The wall thickness of the hook-shaped projection and the width of the groove are accordingly coordinated with one another. Consequently, there is an error-free alignment of the pin remover where the central longitudinal axis of the pin coincides with the pulling direction of the pin remover. In another advantageous development, the projection provided on the holder extends transversely to the pulling direction. This makes it possible for the holder not to be displaced relative to the component when the pin is being pulled out.

In particular, it is not possible for the component to tilt about the central axis of the pin. As a result, the hole is not damaged when the pin is released so that pins inserted subsequently are insertable into the hole with unchanged quality, i.e. with an identically reliable friction fit.

In the case of an advantageous further development of the invention, the projection has an opening for receiving the pin. This means that the projection is divided into two parts on the holder, between which the pin can extend if the groove extends transversely relative to the axial direction of the pin. To produce a simple positive fit between pull rod and pin, the pull rod has a thread that is screw-connectable to the pin. This means that a particularly positive and sufficiently reliable positive locking connection is produced between pin and pin remover in order to remove the pin from the hole.

BRIEF DESCRIPTION OF THE DRAWINGS

The invention is explained by way of a drawing, in which.

Identical components are provided with identical references in all the Figures.

DETAILED DESCRIPTION OF INVENTION

Figure 1:
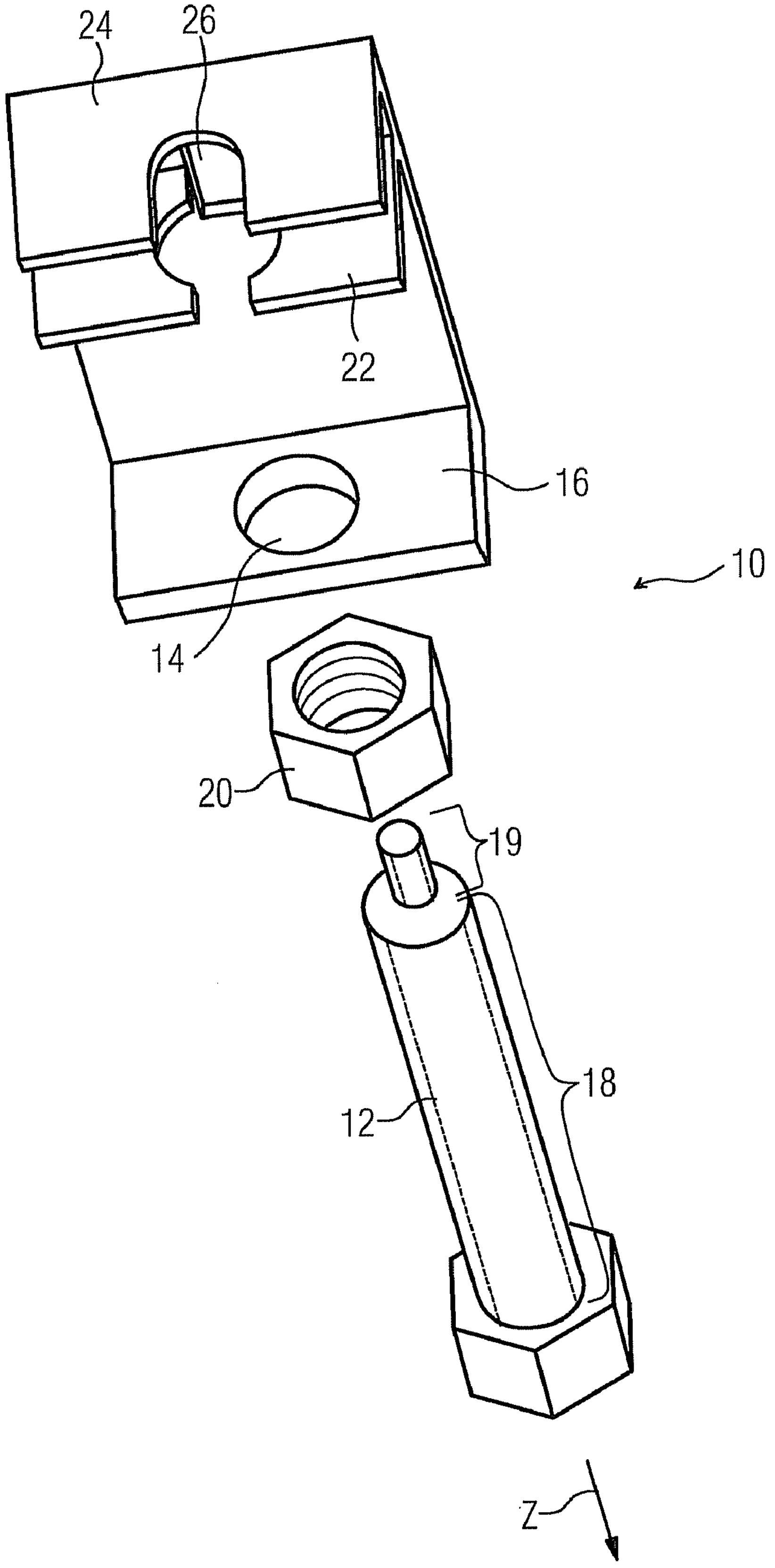
FIG. 1 shows an exploded representation of a multi-part pin remover.

FIG. 1 shows an exploded representation of a multi-part pin remover 10 according to the invention for removing a pin or stud from a hole of a component. The component can be a rotor disc or a gas turbine, for example, as is made known in the European Patent Application with the official number of 07 000 381.9. Through this reference, the object disclosed in the European Patent Application with the official number of 07 000 381.9 is explicitly incorporated into this Patent Application and consequently becomes part of the disclosure of this Patent Application.

The pin remover 10 comprises a holder 16, into the opening 14 of which a pull rod 12 can be inserted. The pull rod 12 is provided with at least one first thread portion 18, to which a screw nut 20 can be screw-connected.

Along with the opening 14, the holder 16 comprises a contact face 22, which can be positioned in a planar manner against the surrounding area of the hole, from which the pin is to be removed. In addition, the holder 16 comprises a hook-shaped projection 24 as means for aligning the pin remover 10 relative to the component, in which projection an additional opening 26 is provided. The free end of the hook-shaped projection 24 extends transversely relative to the pulling direction Z of the pull rod 12.

The pull rod 12 comprises a second section 19, which is provided for producing a positive fit with the pin. The section 19 preferably has a second external thread, which is screw-connectable to a concentric internal thread provided on the pin.

Figure 2:
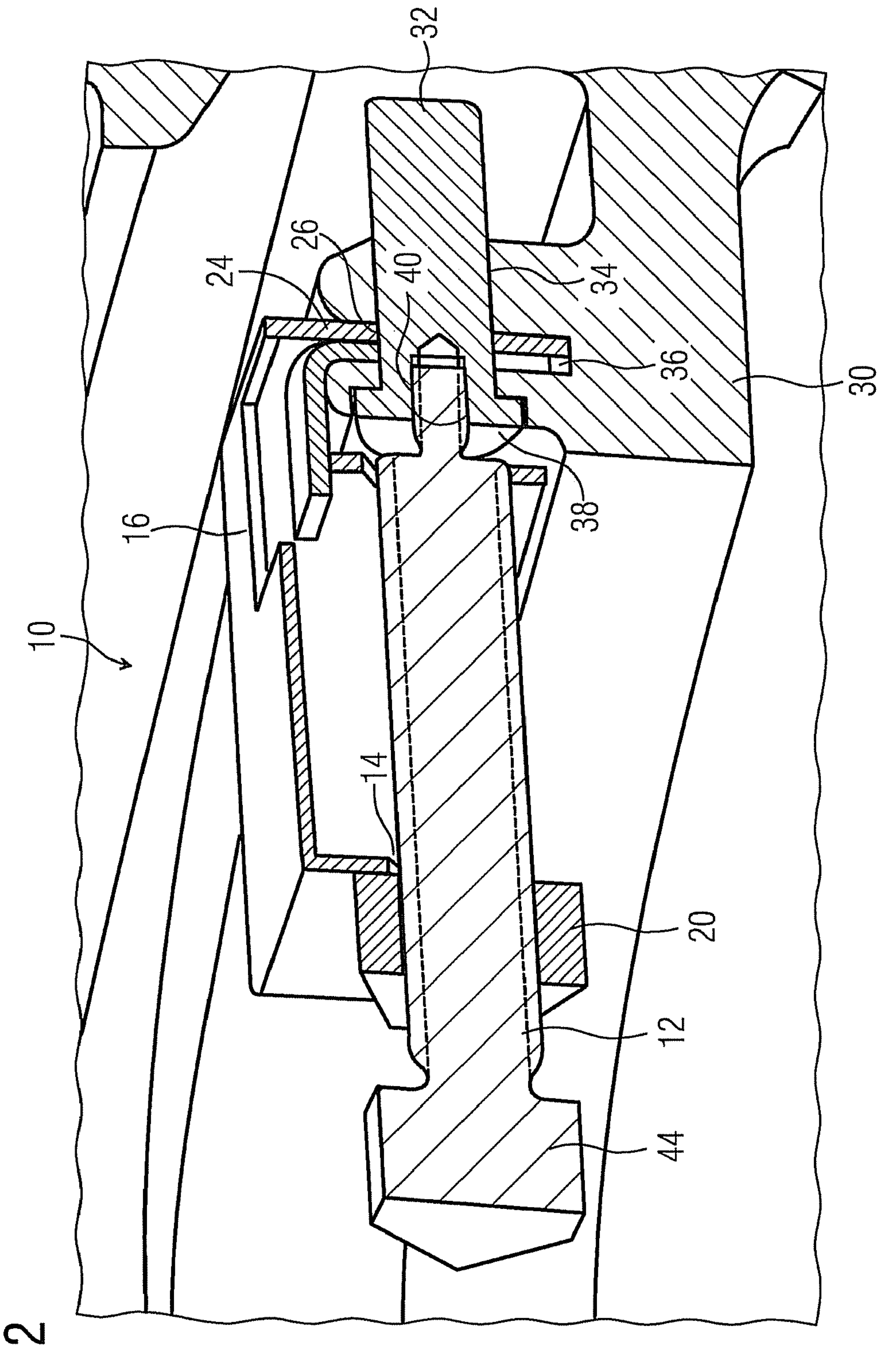
FIG. 2 shows a sectional representation of a pin remover as in FIG. 1, screw-connected to a pin.

FIG. 2 shows a cross-sectional representation of the multi-part pin remover 10 in the assembled state and in the state screw-connected to a pin 32. The pin 32 is recessed in a component 30, for example in the rotor disc known in the aforementioned European Patent Application and serves to secure a sealing element against displacement in the circumferential direction.

The pin 32, in this case, sits in a hole 34, which extends through a groove 36 that is open at one end and is provided in the component 30. An internal thread 40 is provided on the end face 38 of the pin 32, said internal thread being screw-connectable to the thread provided on the second section 19 of the pull rod 12. The hook-shaped projection 24 of the holder 16, in this case, is inserted approximately free from play into the groove 36, the opening 26 provided in the projection 24 engaging the pin 32 at the side. The selected width of the opening 26 corresponds to the external diameter of the pin 32. On account of the predetermined length of the two portions of the projection 24 flanking the opening 26, it is possible to position the axis of rotation of the pull rod 12 in an axially parallel and congruent manner relative to the axis of symmetry of the thread 40 of the pin 32. This reliably avoids the pull rod 12 tilting when being screw-connected to the thread 40 of the pin 32 so that both the external thread provided at the second section 19 and the internal thread 40 of the pin 32 remain undamaged. On account of the components being aligned in such a manner one relative to the other, the pull rod 12 can be screw-connected to the pin 34 in a particularly simple manner.

Once a necessary screw-in depth has been obtained, the pull rod 12 can then be moved in the pulling direction with the help of the screw nut 20 by rotating the screw nut 20 relative to the pull rod 12, the screw nut 20 being supported on the holder 16 and the holder 12 being supported on the component 30. In order to prevent the pull rod 12 also being rotated when the screw nut 20 is rotated, said pull rod can be secured by means of a wrench that can be attached to the head 44 of the pull rod 12.

On account of the form-locked seat of the holder 16 in the component 30, a tilting of the holder 16 can also be reliably avoided when the pin 30 is being pulled out. Consequently, damage to the hole 35 in the component 30 can be reliably excluded so that replacement pins inserted subsequently are retained to the same extent as the pins initially inserted and are retained free from play.

The invention claimed is:

1. A multi-part pin remover for removing a pin or a stud from a hole of a component, the multi-part pin remover comprising:

a pull rod that includes a thread;

a holder that accommodates the pull rod and includes a planar contact face that is aligned at right angles to the pull rod; and a screw nut, wherein the pull rod is connectable in a positive locking manner to the pin to be released and, when the pull rod is connected to the pin, the pull rod is displaceable in the pulling direction by rotating the screw nut that is supported on the holder, and wherein the holder has a hook-shaped projection that is used for aligning the pin remover, wherein the pull rod has two different threads, and wherein a first thread may be screw-connected to the pin for forming a positive fit.

2. The multi-part pin remover as claimed in claim 1, wherein the projection is insertable into a groove that is provided on the component and whereby the projection fits snugly into the groove.

3. The multi-part pin remover as claimed in claim 2, wherein a wall thickness of the groove is coordinated with a first width of the groove so that the projection fits snugly into the groove.

4. The multi-part pin remover as claimed in claim 1, where the projection extends transversely relative to a pulling direction.

5. The multi-part pin remover as claimed in claim 1, wherein the projection has an opening for receiving the pin.

6. The multi-part pin remover as claimed in claim 5, wherein a second width of the opening corresponds to an external diameter of the pin.

7. The multi-part pin remover as claimed in claim 1, wherein the contact face is placed against a surrounding area of the hole which contains the pin to be removed.

* * * * *